(12) United States Patent
McGinnis

(10) Patent No.: US 6,756,772 B2
(45) Date of Patent: Jun. 29, 2004

(54) DUAL-OUTPUT DIRECT CURRENT VOLTAGE CONVERTER

(75) Inventor: Donald Mike McGinnis, Carleton Place (CA)

(73) Assignee: Cogency Semiconductor Inc., Toronto (CA)

(*) Notice: Subject to any disclaimer, the term of this patent is extended or adjusted under 35 U.S.C. 154(b) by 0 days.

(21) Appl. No.: 10/189,548

(22) Filed: Jul. 8, 2002

(65) Prior Publication Data

US 2004/0004465 A1 Jan. 8, 2004

(51) Int. Cl.[7] .................................................. G05F 3/16
(52) U.S. Cl. ........................ 323/225; 323/267; 323/271; 363/60
(58) Field of Search ............................... 323/225, 267, 323/271, 282, 350; 363/60

(56) References Cited

U.S. PATENT DOCUMENTS

| 5,245,524 A | | 9/1993 | Nakagawa et al. ........... 363/62 |
| 5,336,985 A | * | 8/1994 | McKenzie ................... 323/282 |
| 5,412,308 A | * | 5/1995 | Brown ........................ 323/267 |
| 5,455,501 A | * | 10/1995 | Massie ........................ 323/271 |
| 5,532,577 A | * | 7/1996 | Doluca ....................... 323/267 |
| 5,635,776 A | | 6/1997 | Imi ............................. 307/110 |
| 5,886,508 A | * | 3/1999 | Jutras ......................... 323/282 |
| 5,959,442 A | | 9/1999 | Hallberg et al. ............ 323/282 |
| 6,222,352 B1 | * | 4/2001 | Lenk .......................... 323/267 |
| 6,479,972 B1 | * | 11/2002 | Chen .......................... 323/271 |
| 6,566,846 B1 | * | 5/2003 | Voo ............................ 323/267 |

OTHER PUBLICATIONS

Article "Simple Design of Low–Ripple DC/DC Boost Converter", Nikkei Electronics Asia, Dec. 2000.
Website Info "Switch Mode Power Supply", Power Designers, pp. 1–5 and 1–11.
Article DC–DC Converter Tutorial, 2002, Maxim Integrated Products.

* cited by examiner

Primary Examiner—Jeffrey Sterrett
(74) Attorney, Agent, or Firm—Max R. Wood; Ogilvy Renault

(57) ABSTRACT

A step-down switching voltage regulator with a push-pull output stage is adapted to provide a voltage converter with an auxiliary voltage rail that supplies an auxiliary voltage that is higher than the input supply voltage. The push-pull output stage of the step-down voltage regulator is used to drive a charge pump voltage-doubler circuit. In this way, a single integrated topology provides a regulated low voltage output as well as an auxiliary high voltage output. The circuit topology enables a low component count resulting in lower component cost and smaller physical size.

16 Claims, 2 Drawing Sheets

S1 = FET; MOSFET; or BJT
S2 = FET; MOSFET; or BJT

DUAL-OUTPUT DIRECT CURRENT VOLTAGE CONVERTER

CROSS-REFERENCE TO RELATED APPLICATIONS

This is the first application filed for the present invention.

MICROFICHE APPENDIX

Not applicable.

TECHNICAL FIELD

The present invention relates to voltage converters and, in particular, to a dual-output voltage converter that provides a regulated low voltage output as well as an auxiliary high voltage output.

BACKGROUND OF THE INVENTION

Many computer peripherals are powered from a single fixed DC voltage power supply and use step-down switching voltage regulators to supply lower voltages for driving logic circuits. A step-down switching voltage regulator, more commonly known in the art as a "buck" converter, converts an applied input voltage to a lower output voltage. The output stage of a synchronous buck converter typically includes a pair of switches coupled in series across the input voltage supply. One switch, the voltage switch, is coupled to the voltage supply and the other switch is connected to ground. An output filter typically including an inductor and a capacitor is connected to a junction formed by the pair of switches. The capacitor is responsible for reducing the ripple content in voltage across it, whereas the inductor smoothes the current passing through it. The combined action of the LC filter, therefore, reduces the ripple content in the output voltage supplied to a load connected to the buck converter. Typically, feedback from the output of the LC filter is provided to a controller which drives the switches to connect the output filter to the voltage supply or to ground in order to maintain the output voltage at some predetermined low voltage level.

At the same time, however, some applications require a higher voltage than available from the voltage supply to power linear (analog) devices. In this respect, battery-powered equipment use DC/DC step-up converters to generate auxiliary supply voltages for internal circuits that require higher voltages than the available battery voltage. The conventional approach is to use either a switched capacitor voltage booster (i.e. charge pump) or an inductive step-up converter (also called boost converter). Boost converters have a high efficiency over the entire input voltage range. Charge pumps, on the other hand, provide a high efficiency over selected input voltage ranges. Since their design does not require any knowledge of magnetics, charge pumps are much easier to design and implement. In either case, however, such auxiliary high voltage generators usually require the use of a dedicated integrated circuit to provide the boosted voltages.

FIG. 1 illustrates a simplified schematic of a conventional voltage converter 10 used for providing a regulated low voltage output (RLVO) as well as an auxiliary high voltage output (AHVO) from a single applied DC input voltage $V_{IN}$. The input voltage $V_{IN}$ is received at an input terminal 11 and supplied separately to a step-down or "buck" integrated circuit voltage regulator VR1 and to a charge pump voltage doubler circuit VR2. The step-down integrated circuit voltage regulator VR1 includes a circuit block 12, which includes a pair of switches S1 and S2 connected in series between the input terminal 11 and ground. Control circuitry for driving the switches S1 and S2 is not shown but understood to be embodied by the circuit block 12. An output filter that includes an inductor L and a capacitor C is connected at the junction between the pair of switches S1 and S2. The junction between the inductor and capacitor of the output LC filter provides the regulated low voltage output (RLVO). A feedback path 14 is further provided from the output of the LC filter to the circuit block 12 to permit the control circuitry to appropriately drive the switches S1 and S2, so that a constant regulated low voltage output may be maintained.

The charge pump voltage doubler circuit VR2 includes a circuit block 16, which includes a pair of switches S3 and S4 connected in series between the input terminal 11 and ground. The associated control circuitry for driving the switches S3 and S4 is not illustrated but understood to be embodied within the circuit block 16. A first stage of the charge pump circuit VR2 includes a first diode D1 and a first capacitor C1. The input terminal 11 is connected via the first diode D1 to one electrode of the first capacitor while the other electrode of the first capacitor C1 is connected to a junction between the pair of switches S3 and S4 of the circuit block 16. A second stage of the charge pump circuit VR2 includes a second diode D2 and a second capacitor C2. A junction between the first diode D1 and first capacitor C1 is connected via the second diode D2 to one electrode of the second capacitor C2. The other electrode of the second capacitor C2 is connected to ground. The junction between the second diode D2 and second capacitor C2 of the charge pump circuit VR2 provides the auxiliary high voltage output (AHVO).

The step-down voltage regulator VR1 and charge pump VR2 depicted in FIG. 1 are standard circuit topologies whose operation is well known to those skilled in the art and, as such, will not be detailed.

As seen in FIG. 1, a dedicated switched-capacitor voltage booster or charge pump circuit VR2 is needed to provide an auxiliary high voltage output from the single input DC voltage $V_{IN}$ applied to the step-down voltage regulator VR1. Alternatively, an inductive booster may be employed. Either approach, however, requires the use of a dedicated integrated circuit with associated control circuitry to provide an auxiliary boosted voltage from a single applied DC input voltage. This leads to a high component count resulting in higher cost while preventing improvement in integration density.

SUMMARY OF THE INVENTION

It is therefore an object of the present invention to provide a voltage converter that integrates the functions of both a step-down voltage regulator and a charge pump into a single device.

A further object of the present invention is to provide a voltage converter capable of generating both a regulated low voltage output as well as an auxiliary high voltage output from a single applied input DC voltage.

Thus, an aspect of the present invention uses the inherent properties of a conventional step-down or "buck" switching voltage regulator with a push-pull output stage to provide an auxiliary output voltage higher than the applied input voltage. Specifically, the push-pull output stage of the step-down voltage regulator is used to drive a charge pump voltage doubler circuit. Advantageously, the novel circuit topology of the present invention provides a low component (i.e. two diodes and two capacitors) count resulting in lower component cost and smaller physical size.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention combines two commonly used circuit topologies—the buck converter and the voltage doubler charge pump—in a unique way to provide an extra voltage rail using a small number of components. Specifically, the present invention uses the inherent properties of step-down switching voltage regulators with "push-pull" output stages to output an auxiliary voltage higher than the input supply voltage.

Figure 1:
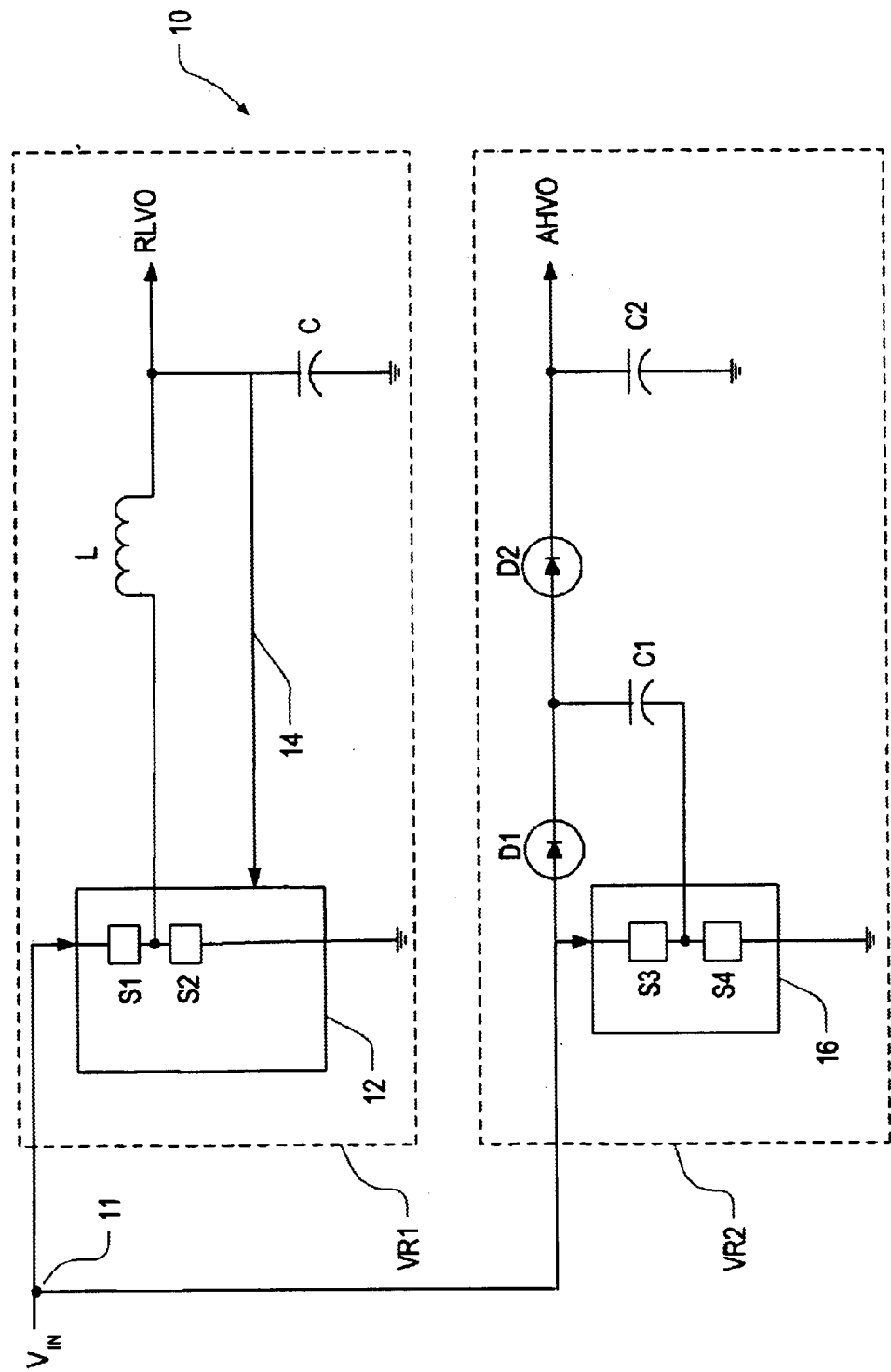
FIG. 1 is a generic schematic of a conventional step-down voltage regulator circuit having a dedicated charge pump add-on circuit.
Figure 2:
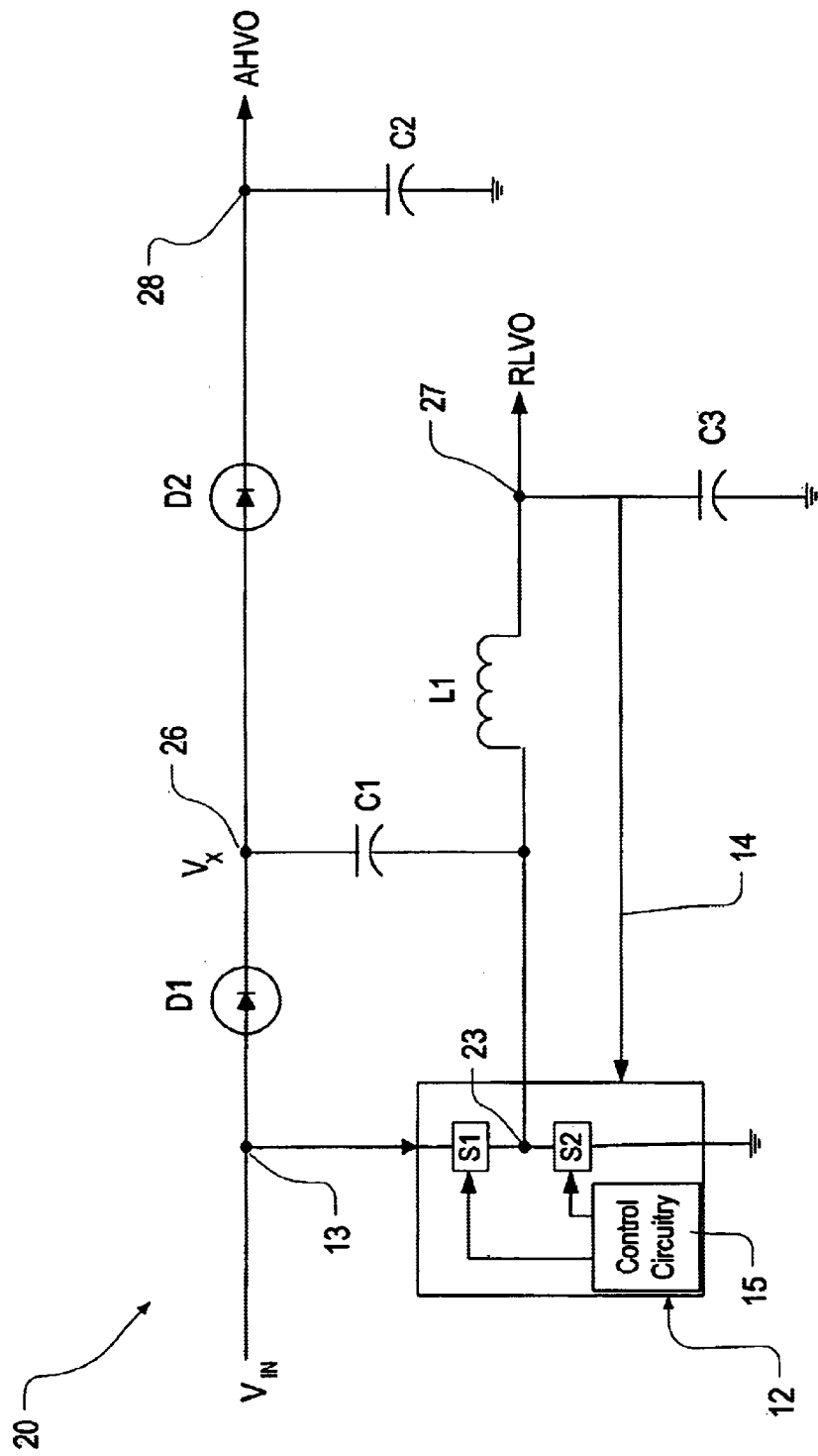
FIG. 2 is a generic schematic of a direct current power supply adapted to provide both a regulated low voltage output as well as an auxiliary high voltage output within a single integrated topology.

FIG. 2 is a generic circuit schematic of a direct current (DC) voltage converter 20 adapted to provide a regulated low voltage output (RLVO) as well as an auxiliary high voltage output (AHVO) in accordance with a preferred embodiment of the present invention. The voltage converter 20 in FIG. 2 integrates a conventional step-down switching voltage regulator circuit with a multi-stage charge pump circuit in a novel manner to provide an auxiliary high voltage output (AHVO) without a dedicated integrated circuit for the charge pump.

FIG. 2 illustrates the voltage converter 20, which includes a circuit block 12 that is coupled to an input terminal 13 that receives an applied input voltage $V_{IN}$. The circuit block 12 has an output stage that includes a pair of switches S1 and S2 connected in series between the input terminal 13 and ground. In the interest of clarity, only the output stage of the circuit block 12 is shown. The specific details of an implementation of control circuitry 15 for driving the switches S1 and S2 to their respective "ON" and "OFF" states has been omitted. It will of course be appreciated that in the development of any implementation of the control circuitry 15, numerous implementation-specific decisions must be made to achieve the developer's specific goals, such as compliance with system-related and business-related constraints, which will vary from one implementation to another. Moreover, it will be understood that such a development effort might be complex and time-consuming, but would nevertheless be a routine undertaking for those of ordinary skill in the art having the benefit of this disclosure.

An output LC filter that includes an inductor L1 and a capacitor C3 is connected at a junction 23 between the pair of switches S1 and S2. The regulated low voltage output (RLVO) is provided at an output terminal 27 of the LC filter. A feedback path 14 is provided from the output of the LC filter to the control circuitry 15 of circuit block 12 in order to appropriately control the turning "ON" and "OFF" of the switches S1 and S2.

The input terminal 13 is also connected via a first diode D1 to a node 26 which, in turn, is connected to one electrode of a first capacitor C1. The orientation of the first diode D1 is such that its anode is connected to the input terminal 13 while its cathode is connected to the node 26. The other electrode of the first capacitor C1 is connected to the junction 23 between the pair of switches S1 and S2. Together, the first diode D1 and first capacitor C2 form a first stage of the multi-stage charge pump add-on circuit of the power supply 20.

The junction between the first diode D1 and the first capacitor C1 at node 26 is connected via a second diode D2 to an output terminal 28, which provides an auxiliary high voltage output (AHVO). The orientation of the second diode D2 is such that its anode is connected to node 26 while its cathode is connected to the output terminal 28. The output terminal 28 is further connected via a second capacitor C2 to ground.

The "push-pull" output stage of the circuit block 12 (i.e. the junction 23 between the switches S1 and S2) switches between the applied input voltage $V_{IN}$ and 0 volts at a frequency defined by the particular device application. A controller (not shown) drives the switches to connect the output filter to the applied input voltage $V_{IN}$ or to ground to maintain the output voltage at a predetermined level. Specifically, the controller drives the switches S1 and S2 so as to connect and disconnect the applied input voltage $V_{IN}$ to the output filter to generate the regulated low voltage output (RLVO).

For ease of description, the applied input voltage $V_{IN}$ is taken to be +3.3 V for the remainder of the disclosure although it will be understood that any input voltage could be used. As mentioned, the output of the circuit block 12 switches between the applied input voltage $V_{IN}$ (~+3.3 V) and 0 volts to provide a regulated low voltage output (RLVO) at the output terminal 27. When the output of the circuit block 12 switches to 0 V (i.e. when the voltage switch S1 is turned "OFF" and the switch S2 is turned "ON"), the first diode D1 is forward biased resulting in the first capacitor C1 being charged to +3.3 V minus a forward voltage drop ($V_D$) across the first diode D1. The forward voltage drop ($V_D$) is typically 0.2 V for a Schottky device or, alternatively, 0.7 V for a normal diode. Assuming Schottky diode operation, the first capacitor C1 is charged to (3.3–0.2) V or 3.1 V.

Then, when the output stage of the circuit block 12 switches to +3.3 V (i.e. when voltage switch S1 is turned "ON" and switch S2 is turned "OFF"), the voltage $V_x$ at node 26 rises momentarily to +6.4 V (3.3 V+3.1 V) and the first diode D1 is reverse biased. The first capacitor C1 thereby discharges into the second capacitor C2 via forward-biasing of the second diode D2. The resulting voltage across the second capacitor C2 will be the auxiliary high voltage output (AHVO). Specifically, this voltage will be 6.4 V minus the forward voltage drop ($V_D$) across the second diode D2 (i.e. 0.2 V for a Schottky device or 0.7 V for a normal diode). Again assuming Schottky diode operation, the voltage across the second capacitor C2 will be 6.2 V. Therefore, the power supply 20 of FIG. 2 provides an auxiliary high voltage output (AHVO) defined by AHVO=2 ($V_{IN}$–$V_D$). As current is drawn from the capacitor C2, the voltage will of course drop somewhat.

Thus, the present invention uses the inherent properties of a conventional step-down switching voltage regulator with a push-pull output stage to provide an auxiliary voltage rail higher than the input supply voltage. The push-pull output stage of the step-down voltage regulator is used to drive a charge pump voltage-doubler circuit. Advantageously, the circuit topology of the present invention provides a low component count (i.e. two diodes and two capacitors) resulting in lower component cost and smaller physical size.

It should be noted that the switches S1 and S2 in FIG. 2 may be any suitable switch type for connecting and disconnecting the applied input voltage $V_{IN}$ to the output terminal 23 of the circuit block 12. For example, transistor switches may be used in which case any of bipolar junction transistor (BJT), junction field-effect transistor (JFET), metal oxide semiconductor field effect transistors (MOSFET), or bipolar CMOS (BiCMOS) technologies may be employed.

Those skilled in the art will appreciate that the multi-stage charge pump circuitry depicted in FIG. 2 may include additional diode-capacitor stages cascaded together in order to boost the input voltage to higher levels. In this way, the voltage converter of the present invention may be adapted to provide an auxiliary high voltage output (AHVO) equal to $n(V_{IN}-V_D)$, where n equals the number of diode-capacitor stages in the multi-stage charge pump circuitry.

The embodiment(s) of the invention described above is (are) intended to be exemplary only. The scope of the invention is therefore intended to be limited solely by the scope of the appended claims.

I claim:

1. A dual-output direct current (DC) voltage converter for converting an input DC voltage to at least two different output DC voltages, comprising:
   an input terminal for receiving the input DC voltage from a power voltage source;
   a step-down voltage regulator circuit connected to the input terminal for providing a regulated output DC voltage lower than the input DC voltage; and
   a charge pump circuit connected to the input terminal and coupled to the step-down voltage regulator circuit, for providing an auxiliary output DC voltage higher than the input DC voltage;
   wherein the step-down voltage regulator circuit includes first and second switches coupled in series between the input terminal and a ground potential, and an output filter connected at a junction between the first and second switches; and
   the charge pump circuit is further coupled to the step-down voltage regulator circuit at the junction between the first and second switches of the step-down voltage regulator circuit.

2. A dual-output voltage converter as claimed in claim 1 wherein the first and second switches comprise first and second bipolar transistors.

3. A dual-output voltage converter as claimed in claim 1 further comprising control circuitry for preventing the first and second switches from simultaneously being on.

4. A dual-output voltage converter as claimed in claim 3 wherein the output filter comprises an inductor connected in series with a storage capacitor.

5. A dual-output voltage converter as claimed in claim 4 wherein a junction between the inductor and storage capacitor provides the regulated output DC voltage lower than said input DC voltage.

6. A dual-output voltage converter as claimed in claim 5 wherein the regulated output DC voltage provided at the junction between the inductor and storage capacitor is fed back to the controller to maintain the regulated output DC voltage at a predetermined level.

7. A dual-output voltage converter as claimed in claim 1 wherein the first and second switches comprise first and second field effect transistors.

8. A dual-output voltage converter as claimed in claim 1 wherein the charge pump circuit comprises a first stage having a first diode coupled to a first capacitor wherein an anode of the first diode is coupled to the input terminal, a cathode of the first diode is coupled to a first electrode of the first capacitor and a second electrode of the first capacitor is coupled to the junction between the first and second switches.

9. A dual-output voltage converter as claimed in claim 8 wherein the first and second field effect transistors are metal oxide semiconductor field effect transistors (MOSFETs).

10. A dual-output voltage converter as claimed in claim 8 wherein the charge pump circuit further comprises a second stage having a second diode coupled to a second capacitor wherein an anode of the second diode is coupled to a junction between the first diode and the first capacitor, a cathode of the second diode is coupled to a first electrode of the second capacitor, and a second electrode of the second capacitor is coupled to a ground potential.

11. A dual-output voltage converter as claimed in claim 10 wherein the first and second switches of the step-down voltage regulator circuit further control the first and second capacitors of the charge pump circuit so that the first capacitor is charged by the input voltage and the second capacitor is charged by a discharge of the first capacitor.

12. A dual-output voltage converter as claimed in claim 10 wherein a junction between the second diode and second capacitor provides the auxiliary output DC voltage higher than said input DC voltage.

13. A dual-output DC voltage converter for converting an input DC voltage to at least two different DC output voltages, comprising:
   an input terminal for receiving the input DC voltage from a power voltage source;
   a step-down voltage regulator circuit that includes controlled switches connected in series between the input terminal and a ground potential;
   an output filter connected between a low-voltage output terminal and a junction between the switches; and
   a multi-stage charge pump circuit connected to the input terminal and coupled to the junction between the switches, for providing an auxiliary output DC voltage higher than the input DC voltage.

14. A dual-output voltage converter as claimed in claim 13 wherein the multi-stage charge circuit comprises a first stage having a first diode with a cathode coupled to a first electrode of a first capacitor and an anode coupled to the input terminal, a second electrode of the first capacitor being coupled to the junction between the switches.

15. A dual-output voltage converter as claimed in claim 14 wherein the multi-stage charge circuit further comprises a second stage having a second diode with an anode coupled to a junction between the first diode and the first capacitor and a cathode connected to a first electrode of a second capacitor.

16. A dual-output voltage converter as claimed in claim 15 wherein a junction between the cathode of the second diode and the first electrode of the second capacitor is connected to an auxiliary output terminal of the dual output voltage converter, and a second electrode of the second capacitor is connected to a ground potential.

* * * * *